J. H. COURNYER.
SIPHON CREAM REMOVER.
APPLICATION FILED OCT. 18, 1917.

1,280,965.

Patented Oct. 8, 1918.

Witness
F. E. Barry
Myron E. Clear

Inventor
James H Cournyer,

By Munn & Co.

Attorneys

UNITED STATES PATENT OFFICE.

JAMES HERBERT COURNYER, OF OSKALOOSA, IOWA.

SIPHON CREAM-REMOVER.

1,280,965.                    Specification of Letters Patent.         Patented Oct. 8, 1918.

Application filed October 18, 1917. Serial No. 197,255.

*To all whom it may concern:*

Be it known that I, JAMES H. COURNYER, a citizen of the United States, and a resident of Oskaloosa, in the county of Mahaska and State of Iowa, have invented a new and useful Improvement in Siphon Cream-Removers, of which the following is a specification.

My present invention relates generally to siphon cream removers, and more particularly to a siphon cream remover of the type described and claimed in my Patent 1237871, of August 21, 1917, upon which my present improvements are based, the object thereof being the provision of a simplified construction, capable of equally effective results, and adapted to obviate certain unnecessarily complicated parts of the construction of my patent mentioned.

Figure 1:
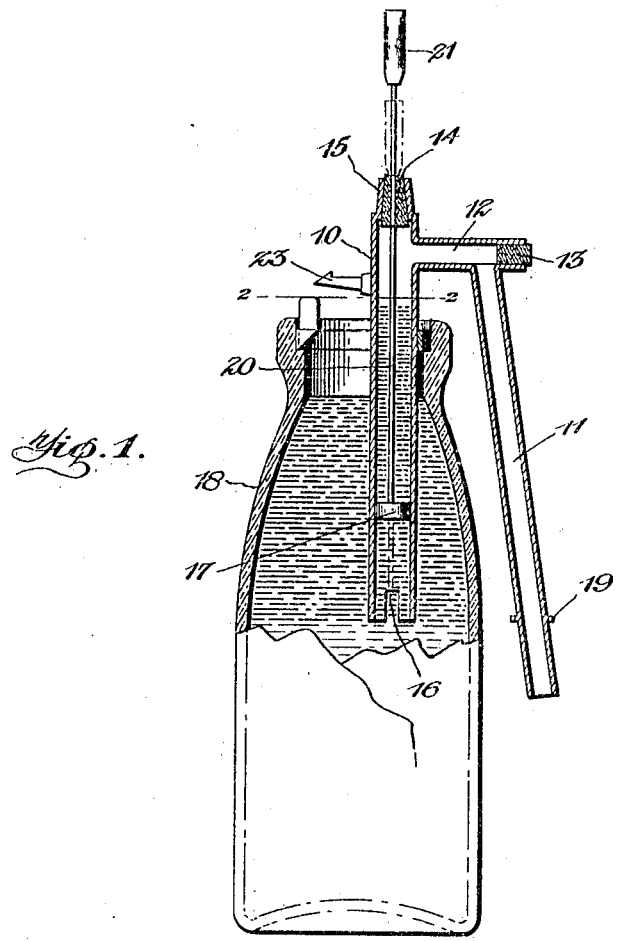
Figure 2:
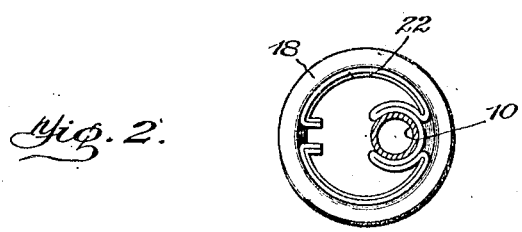

The improved construction involved in my present invention will now be described in connection with the accompanying drawing, forming a part of this specification, and wherein:

Figure 1 is a view partly in elevation and partly in section, illustrating the practical application of my invention, and Fig. 2 is a horizontal section taken substantially on line 2—2 of Fig. 1.

Referring now to these figures, my present improvements, as in my patent above referred to, include an intake tube 10, an outlet tube 11, and a connecting tube 12, the outlet and connecting tubes being of the same cross sectional area and the intake tube 10 being of a greater cross sectional area than that of the outlet and connecting tubes.

The connecting tube 12 extends from a point adjacent the upper end of the intake tube 10 and communicates with the upper end of the outlet tube 11, beyond which the extreme end of the connecting tube is closed by a plug 13.

The upper end of the intake tube 10 beyond the connecting tube 12 is likewise closed by a plug 14 in the present construction, for which purpose the upper extremity of the tube has a contracted plug seat 15.

The opposite or lower end of the intake tube 10 is slotted as indicated at 16, to a point above the plunger 17 when the latter is in its lowermost position, so that with the plug down, the cream within a bottle and the like 18, into which the intake tube is extended, may find its way above the plunger 17 and up to the normal level of the cream in the bottle.

In accordance with the present improvements, furthermore, the outlet tube 11 which extends downwardly and is preferably inclined with respect to the intake tube 10, is provided with an indicator in the form of an annular rib 19 opposite the slotted end 16 of the intake tube, so as to enable the operator to quickly and effectively lower the intake end of the intake tube to the lower cream line by alining the indicating rib with the cream line seen through the bottle 18.

The plunger 17 has a stem 20 which extends upwardly and exteriorly through the plug 14 and is provided at its outer end with a cylindrical head 21 capable of passage entirely through the said intake tube so as to adapt the same to removal with the stem 20 and plunger 17, by removing the plug 14, which latter as will be noted, is removable toward the intake end of the said tube.

The cylindrical external head 21 of the stem 20 is furthermore, of a diameter adapted to interfit the connecting tube 12 and the outlet tube 11, so that upon removal of plug 13, after removal of the plunger and stem, the latter may be reversed and its head 21 used to clean out the said outlet and connecting tubes.

The head 21 is, furthermore, so positioned with respect to the plunger 17 and the length of the intake tube 10 as to engage the plug 14 or the upper end of the intake tube 10 and limit movement of the plunger 17 toward the slotted end of the said intake tube, so as to prevent movement of the plunger beyond the intake end of the tube in the normal operation.

As in my patent above referred to, the siphon is introduced in use, by extending its intake tube 10 downwardly into the upper portion of a milk bottle or the like 18, and may be held in the operative position shown in Fig. 1, by means of a spring clasping member generally indicated at 22, seated within the upper open end of the bottle and a portion of which engages the tube 10. It is obvious, however, that in connection with the usual milk bottle, it is necessary to remove the ordinary milk bottle cap previous to the introduction of the tube 10, and for this purpose I propose to provide the latter with a laterally projecting spur 23 and the like, at a point intermediate its end, by insertion of which through the usual paper top, removal of the latter may be readily effected.

I claim:

1. A siphon cream remover comprising intake and outlet tubes, of which the former is of greater cross sectional area than that of the latter, a plunger interfitting the intake tube, said intake tube having a slotted intake end and a reduced portion forming an outwardly tapering plug seat at its opposite end, a plug normally seated in said plug seat and movable therefrom inwardly of the intake tube, and a stem connected to the said plunger and normally extending exteriorly through the said plug, said stem being removable with the plug and having means at its outer end forming a handle and adapted to interfit the said outlet tube, for the purpose described.

2. A siphon cream remover comprising intake and outlet tubes, of which the former is of greater cross sectional area than that of the latter, a plunger interfitting the intake tube, said intake tube having a slotted intake end and a reduced portion forming an outwardly tapering plug seat at its opposite end, a plug normally seated in said plug seat and movable therefrom inwardly of the intake tube, and a stem connected to the said plunger and normally extending exteriorly through the said plug, said stem being removable with the plug and having means at its outer end forming a handle and adapted to interfit the said outlet tube, for the purpose described, said handle being disposed relative to the length of the stem to normally engage the said plug and limit movement of the plunger toward the slotted end of the tube.

JAMES HERBERT COURNYER.

Witnesses:
 CARL JOHNSON,
 MILDRED CUNNINGHAM.

Copies of this patent may be obtained for five cents each, by addressing the "Commissioner of Patents, Washington, D. C."